Figure 1:
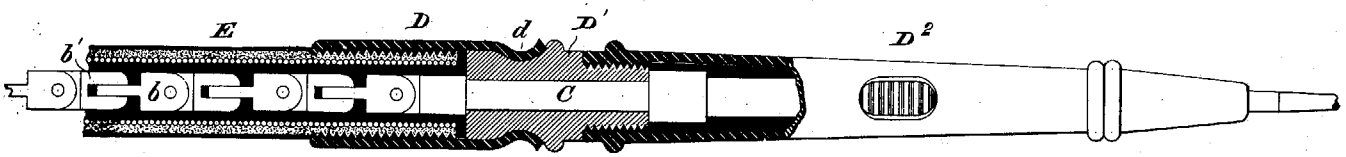

E. T. STARR,

Assignor to S. S. WHITE.

Dental-Engine.

No. 8,704. Reissued May 6, 1879.

WITNESSES

Wm A Skinkle

Geo W Breck

INVENTOR

Eli T. Starr.

By his Attorneys

Baldwin Hopkins & Peyton

UNITED STATES PATENT OFFICE.

ELI T. STARR, OF PHILADELPHIA, PENNSYLVANIA, ASSIGNOR TO SAMUEL S. WHITE, OF SAME PLACE.

IMPROVEMENT IN DENTAL ENGINES.

Specification forming part of Letters Patent No. 157,646, dated December 8, 1874; Reissue No. 7,960, dated November 20, 1877; Reissue No. 8,704, dated May 6, 1879; application filed November 22, 1878.

*To all whom it may concern:*

Be it known that I, ELI T. STARR, of the city and county of Philadelphia, in the State of Pennsylvania, have invented certain new and useful Improvements in Dental Engines, of which the following is a specification.

My invention relates to dental engines of the class in which motion is communicated from a power-driven shaft, through a flexible shaft, to a tool mounted in a hand-piece, by which means the angle at which the tool is working relatively to the driving-shaft may be freely varied without interruption to the transmission of the driving-power.

Jointed shafts, coiled-wire shafts, rattan, and catgut have all heretofore been used, or proposed to be used, as a flexible driving-shaft; but experience has demonstrated that none of these devices work as perfectly as is desirable.

The long jointed shafts are not sufficiently flexible; the wire coil is liable to kink; the rattan to twist apart; and the catgut, apparently, scarcely possesses sufficient rigidity for the purposes required.

It is the object of the first part of my invention to provide a flexible driving-shaft capable of yielding flexibly in all directions without interfering with the transmission of the driving-power, and yet be free from tendency to kink; to which ends my improvement consists in a flexible shaft for transmitting power, consisting of a chain or cable composed of short links, the shaft being capable of flexing freely, and yet rigid under torsional strain.

My improvement further consists in combining a stiff power-driven shaft, a flexible chain cable, and a socket-piece, tool-holder, or chuck mounted in bearings in the hand-piece casing of a dental engine, and adapted to receive a dental tool.

My invention further consists in combining a chain-cable driving-shaft with a flexible sheath in which said cable works.

The next part of my invention relates more especially to the hand-piece; and consists in so constructing the casing of the hand-piece of straight tubular sections that the rigid spindle tool holder or chuck mounted therein may be held by the handle-section of the casing centrally of the fingers and thumb of the operator, with the capacity of turning or swiveling said handle-section freely relatively to a shank-section, whereby the turning movements of the hand of the operator are accommodated without impeding or interfering with the free rotation of the chuck in its bearings.

This part of my invention further consists in the combination of a hand-piece possessing the characteristics of casing and tool-holder or chuck above set forth with a flexible driving-shaft connected with the tool-holder so as to turn it; and, further, in the combination of such a hand-piece with a flexible driving-shaft and a flexible sheath or covering, through which the said shaft passes, and to which the shank-section of the hand-piece casing is applied.

Figure 2:
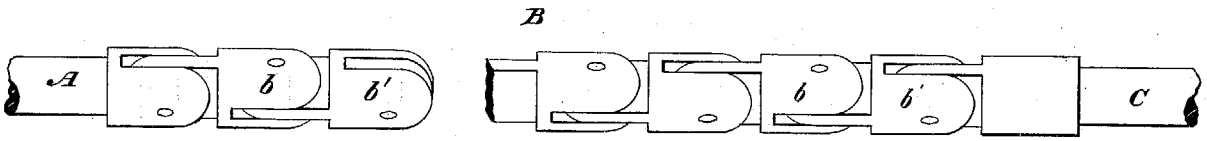

In the accompanying drawings, which exemplify the best way now known to me of carrying out my invention, Figure 1 represents a view, partly in section, of so much of the apparatus as is necessary to illustrate the invention herein claimed; and Fig. 2, a view in perspective of a portion of the driving-shaft detached, and shown on an enlarged scale.

The shaft A, driven by power in any suitable well-known way, has a cable, B, pin-jointed to it at one end. This cable is, by preference, composed of links $b$ $b'$, of the form shown in the drawings, each link being composed of a perforated plate of about half the depth of the link, and a forked head, the slot of which is at right angles to the plane of the plate, each plate being pin-jointed in the forks of the adjacent link.

By this mode of construction the cable is free to flex laterally, but is quite rigid against torsional strains, as the plates fit snugly between the forks of the head in which they are pivoted.

I have found by experience that a cable thus constructed is quite free from any tendency to kink.

The ends of the cable farthest from the shaft A are pin-jointed to a rigid-spindle tool-holder or chuck, C, turning in suitable bearings in the hand-piece casing, composed of straight tubular sections D $D^1$ $D^2$, (three being shown,) the inner one or shank section, D, being adapted or designed to be firmly connected with the outer end of a flexible sheath or covering, E, which envelops the flexible driving-shaft. The second section, $D^1$, is connected to the shank-section by a swivel-joint, *d*, of well-known construction, and with the third or handle section, $D^2$, which surrounds the tool-holder and forms a sheath for it, by screw-threads, as usual, so as to permit of the ready separation of the detachable sections when it is desired to inspect the tool-holder or chuck, or the interior of the casing.

By thus constructing the hand-piece, the tool-holder may be held by the tubular handle-section of the casing centrally of the fingers and thumb of the operator, with the capacity of turning or swiveling the said handle-section freely relatively to the shank-section, this being permitted by the swivel-joint, whereby the turning movements of the hand of the operator are accommodated or conformed to without interrupting the free revolution of the tool-holder and operating-tool, or varying the angle or direction of the tool.

The flexible sheath may be of any well-known construction—such, for instance, as that shown in Nelson Stow's patent of August 6, 1872.

The operating-tools may be secured in the tool-holder, socket, or chuck in well-known ways.

I am aware that a dental-engine hand-piece casing capable of turning upon the tool-holder and relatively to the driving-shaft is not new, such being shown in Chandler Poor's patent of August 22, 1871. Neither is it new to provide a dental-engine hand-piece with an angle attachment adapted to be mounted on the hand-piece and swivel or turn thereon, in which case the operating-tool is carried with the attachment in its swiveling movements, although its revolution is unimpeded, such a device being shown in English Patent No. 529 of 1856.

I am not aware, however, that prior to the date of my invention a hand-piece for dental engines has been constructed in which the casing which surrounds and forms a sheath for the tool-holder or chuck is composed of straight tubular sections, connected together by a swivel-joint, so that the handle-section, upon which the fingers of the operator rest, may swivel or turn axially, relatively to a shank-section, around the tool-holder and tool without changing the angular direction of the tool or impeding its rotation.

I am also aware that a flexible sheath connected with a hand-piece casing by a slip-coupling, which permits of the separation of the parts, is shown in Alexander Hartman's patent of August 22, 1871; but this is not a swivel-joint in the sense of my invention, because it does not embody any means of preventing endwise separation of the parts by a pulling strain.

I am also aware that the sections of a hand-piece casing have been connected together by screw-threads, which admit of the simultaneous turning and endwise movement of the parts to separate them; but this is not a swivel-joint in the sense in which I use that term, because it does not permit the turning of the parts without endwise movement.

In my hand-piece the handle and shank sections are connected through the intervention of a swivel-joint, which permits the handle-section to turn freely relatively to the shank-section without endwise movement or separation when so swiveling; and the advantages of my improvements are so obvious, and their differences from the inventions referred to so radical, as to render unnecessary further elaboration.

I claim as of my own invention—

1. The chain-cable driving-shaft for dental engines, constructed, substantially as hereinbefore set forth, of short links, and capable of flexing freely, yet rigid, under torsional strain, the same constituting a new article of manufacture.

2. The combination, substantially as hereinbefore set forth, of the rotating power-driven shaft, the flexible short-linked chain-cable driving-shaft, the tool-holder or chuck, and the hand-piece casing.

3. The combination, substantially as hereinbefore set forth, of the hand-piece, the short-linked chain-cable driving-shaft, and the flexible sheath enveloping the said driving-shaft.

4. The combination, substantially as hereinbefore set forth, of a rigid-spindle rotary tool-holder with a straight swiveling tubular sectional hand-piece casing composed of a tubular shank-section and a tubular handle-section, connected by a swivel-joint, the tubular handle-section surrounding the tool-holder and forming a sheath for it, so that the tool-holder may be held by the handle-section centrally of the fingers and thumb of the operator, with the capacity of turning the handle-section freely relatively to the shank-section.

5. The combination, substantially as hereinbefore set forth, of the flexible shaft, the rigid-spindle tool-holder connected therewith so as to be turned thereby, and the straight swiveling tubular sectional hand-piece casing composed of a tubular shank-section and a tubular handle-section connected by a swivel-joint, the tubular handle-section surrounding the tool-holder and forming a sheath for it, so that the tool-holder may be held by the handle-section centrally of the fingers and thumb of the operator, with the capacity of turning the handle-section freely relatively to the shank-section.

6. The combination, substantially as hereinbefore set forth, of a flexible shaft, the rigid-spindle tool-holder connected therewith so as to be turned thereby, a flexible sheath enveloping said flexible shaft, and the straight swiveling tubular sectional hand-piece casing composed of a tubular shank-section and a tubular handle-section connected by a swivel-joint, the tubular handle-section surrounding the tool-holder and forming a sheath for it, so that the tool-holder may be held by the handle-section centrally of the fingers and thumb of the operator, with the capacity of turning the handle-section freely relatively to the shank-section.

ELI T. STARR.

Witnesses:
G. M. MAYNADIER,
WM. J. PEYTON.